(12) United States Patent
Muhammad

(10) Patent No.: US 8,964,875 B2
(45) Date of Patent: Feb. 24, 2015

(54) ADAPTIVE IQ IMBALANCE ESTIMATION

(71) Applicant: MStar Semiconductor, Inc., Hsinchu (TW)

(72) Inventor: Khurram Muhammad, Garland, TX (US)

(73) Assignee: MStar Semiconductor, Inc., Chupei (TW)

( * ) Notice: Subject to any disclaimer, the term of this patent is extended or adjusted under 35 U.S.C. 154(b) by 0 days.

(21) Appl. No.: 13/913,771

(22) Filed: Jun. 10, 2013

(65) Prior Publication Data

US 2014/0362955 A1    Dec. 11, 2014

(51) Int. Cl.
*H04L 27/10*     (2006.01)
*H04B 1/10*      (2006.01)

(52) U.S. Cl.
CPC ................................. *H04B 1/1027* (2013.01)
USPC ............................ 375/284; 375/285; 375/346

(58) Field of Classification Search
CPC ........................ H04L 27/2647; H04L 27/3863
USPC .......................................... 375/284, 285, 346
See application file for complete search history.

(56) References Cited

U.S. PATENT DOCUMENTS

| | | | |
|---|---|---|---|
| 8,014,366 B2 * | 9/2011 | Wax et al. ...................... | 370/338 |
| 8,503,926 B2 * | 8/2013 | Gainey et al. ..................... | 455/7 |
| 8,594,212 B2 * | 11/2013 | Andgart et al. ............... | 375/260 |
| 2005/0047384 A1 * | 3/2005 | Wax et al. ...................... | 370/338 |

OTHER PUBLICATIONS

Elahi et al., "I/Q Mismatch Compensation in a 90 nm Low-IF CMOS Receiver", *IEEE International Solid-State Circuits Conference*, pp. 542, 543 and 616 (2005).
Elahi et al., "I/Q Mismatch Compensation Using Adaptive Decorrelation in a Low-IF Receiver in 90-nm CMOS Process", *IEEE Journal of Solid-State Circuits*, vol. 41, No. 2, pp. 395-404 (Feb. 2006).

* cited by examiner

*Primary Examiner* — Qutbuddin Ghulamali
(74) *Attorney, Agent, or Firm* — Edell, Shapiro & Finnan, LLC

(57) ABSTRACT

A transceiver includes an input node to receive an input signal having in-phase (I) data and quadrature (Q) data, the input signal including several data samples. A correlation module determines an autocorrelation of the in-phase data, an autocorrelation of the quadrature data, a difference between the autocorrelation of the in-phase data and the autocorrelation of the quadrature data, and a cross correlation between the in-phase data and the quadrature data. An averaging module determines an average of the difference between the autocorrelation of the in-phase data and the autocorrelation of the quadrature data, and an average of the cross correlation between the in-phase data and the quadrature data, in which the averages are determined over a specified number of data samples. A compensation module, based on the average difference between the autocorrelation of the in-phase data and the autocorrelation of the quadrature data, and the average cross correlation between the in-phase data and the quadrature data, determines compensated in-phase data and quadrature data having reduced IQ mismatch.

20 Claims, 15 Drawing Sheets

ADAPTIVE IQ IMBALANCE ESTIMATION

TECHNICAL FIELD

The present disclosure relates generally to adaptive IQ imbalance estimation.

BACKGROUND

A smart phone may have a wireless large area network (LAN) having a power amplifier integrated with the transceiver. In order for the power amplifier to provide a high linear output power, amplifier pre-distortion may be used to compensate for distortions in the power amplifier. In a system using I-Q modulation and de-modulation, a signal has in-phase (I) and quadrature-phase (Q) components that are processed through I and Q channels, respectively. Each path may include components such as a mixer, a low pass filter, and an analog-to-digital converter. The mismatches between the components in the I and Q paths reduce the quality of the signal. In order to achieve a high performance in the amplifier pre-distortion, it is preferable to remove imbalance between in-phase and quadrature channel signals.

SUMMARY

In one aspect, an apparatus includes an input node to receive a first signal having in-phase (I) data and quadrature (Q) data, the first signal including a plurality of data samples; a correlation module to determine an autocorrelation of the in-phase data, an autocorrelation of the quadrature data, a difference between the autocorrelation of the in-phase data and the autocorrelation of the quadrature data, and a cross correlation between the in-phase data and the quadrature data; an averaging module to determine an average of the difference between the autocorrelation of the in-phase data and the autocorrelation of the quadrature data, and an average of the cross correlation between the in-phase data and the quadrature data, the averages being determined over a specified number of data samples; and a compensation module to, based on the average difference between the autocorrelation of the in-phase data and the autocorrelation of the quadrature data, and the average cross correlation between the in-phase data and the quadrature data, determine compensated in-phase data and quadrature data having reduced IQ mismatch.

Implementations of the apparatus may include one or more of the following features. The apparatus may include a control module to control the specified number of data samples over which the difference between the autocorrelation of the in-phase data and the autocorrelation of the quadrature data, and the cross correlation between the in-phase data and the quadrature data are averaged. The control module may set the specified number to a smaller number at a start of a process for compensating IQ mismatch, and later sets the specified number to a larger number. The compensation module may determine the compensated in-phase and quadrature data based on a least-mean-square process. The apparatus may include a control module to control a rate of convergence for the least-mean-square process. The control module may set the rate of convergence to a higher value at a start of the least-mean-square process and later set the rate of convergence to a lower value. The apparatus may include an output node to transmit a second signal having in-phase and quadrature data; and a second compensation module to receive a coupled signal representative of the second signal, determine coefficients for a least-mean-square process that can reduce IQ mismatch in the coupled signal, and apply the coefficients in a least-mean square process to reduce IQ mismatch in the second signal. The compensation module may determine the compensated in-phase and quadrature data by subtracting an image of the first signal from the first signal, in which the image of the first signal is determined by multiplying a conjugate of the first signal with a weight value. The compensation module may use a least-mean-square process to calculate the weight value to minimize the IQ mismatch in the compensated in-phase and quadrature data.

In another aspect, a method includes receiving, at a receiver, a first signal having in-phase (I) data and quadrature (Q) data, the first signal including a plurality of data samples; determining a difference between an autocorrelation of the in-phase data and an autocorrelation of the quadrature data; determining a cross correlation between the in-phase data and the quadrature data; determining an average of the difference between the autocorrelation of the in-phase data and the autocorrelation of the quadrature data, and an average of the cross correlation between the in-phase data and the quadrature data, the averages being determined over a specified number of data samples; and determining, based on the average difference between the autocorrelation of the in-phase data and the autocorrelation of the quadrature data, and the average cross correlation between the in-phase data and the quadrature data, compensated in-phase data and quadrature data having reduced IQ mismatch.

Implementations of the method may include one or more of the following features. The method may include, as part of the process for determining compensated in-phase data and quadrature data, modifying the specified number of data samples over which the difference between the autocorrelation of the in-phase data and the autocorrelation of the quadrature data, and the cross correlation between the in-phase data and the quadrature data are averaged. The method may include setting the specified number to a smaller number at a start of the process for compensating IQ mismatch, and later setting the specified number to a larger number. Determining the compensated in-phase data and quadrature data may include applying a least-mean-square process to determine the compensated in-phase data and quadrature data. The method may include varying a rate of convergence for the least-mean-square process. The method may include setting the rate of convergence to a higher value at a start of the least-mean-square process and later setting the rate of convergence to a lower value. The method may include transmitting a second signal having in-phase data and quadrature data; determining coefficients for a least-mean-square process for reducing IQ mismatch in a coupled signal representative of the transmit signal; and applying the coefficients in a least-mean-square process to reduce IQ mismatch in the second signal. Determining the compensated in-phase data and quadrature data may include determining an image of the first signal by multiplying a conjugate of the first signal with a weight value; and subtracting the image of the first signal from the first signal. The method may include using a least-mean-square process to determine the weight value to minimize the IQ mismatch in the compensated in-phase data and quadrature data.

In another aspect, a transceiver includes a receiver to receive and process a first signal having first in-phase (I) data and first quadrature (Q) data, the first signal including a plurality of data samples; a compensation module to determine first compensation coefficients for compensating IQ mismatch in the receiver based on an average difference between an autocorrelation of the first in-phase data and an autocorrelation of the first quadrature data, and an average cross correlation between the first in-phase data and the first quadrature data; a transmitter to process and transmit a second signal having second in-phase (I) data and second quadrature (Q) data, the second signal including a plurality of data samples; a coupler to couple a portion of the second signal to the receiver; wherein the compensation module is configured to determine second compensation coefficients for compensating IQ mismatch in the transmitter based on the first compensation coefficients, an average difference between an autocorrelation of the second in-phase data and an autocorrelation of the second quadrature data, and an average cross correlation between the second in-phase data and the second quadrature data.

In another aspect, a method includes receiving an input signal having in-phase (I) data and quadrature (Q) data, the input signal comprising a plurality of data samples; determining compensation coefficients for compensating IQ mismatch in a receiver by applying a least-mean-square process to a function representing a compensated signal, the function including a first component representing a data sample multiplied by a first coefficient, a second component representing a conjugate of the data sample multiplied by a second coefficient, and a third component representing a DC offset, the least-mean-square process jointly determining the first coefficient, the second coefficient, and the DC offset; and determining, based on the first coefficient, the second coefficient, and the DC offset, compensated in-phase data and quadrature data having reduced IQ mismatch.

Implementations of the method may include the following feature. The least-mean-square process includes several iterations, and the first coefficient is updated in successive iterations by adding to the first coefficient a component derived from multiplying the data sample by an error term, in which the error term represents a difference between a delayed ideal signal and the compensated signal.

DETAILED DESCRIPTION

Figure 1:
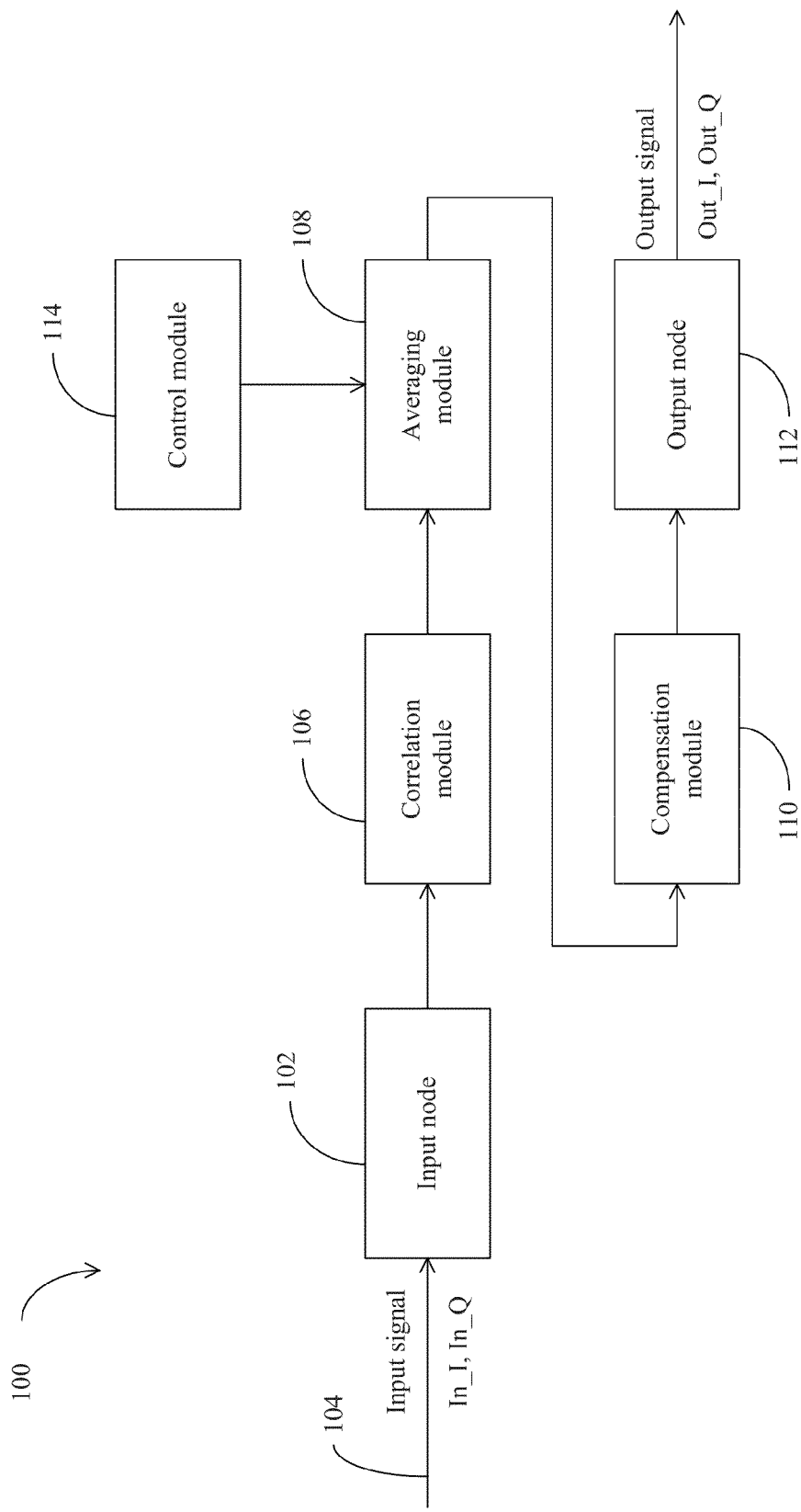
FIG. 1 is a block diagram of a portion of an exemplary wireless system that adaptively compensates I-Q imbalance.

Referring to FIG. 1, in some examples, a wireless system 100 includes an input node 102 to receive an input signal 104 having in-phase (I) data and quadrature (Q) data. For example, the wireless system 100 can be a mobile phone or a wireless router. The input signal includes several data samples. A correlation module 106 determines an autocorrelation of the in-phase data, an autocorrelation of the quadrature data, a difference between the autocorrelation of the in-phase data and the autocorrelation of the quadrature data, and a cross correlation between the in-phase data and the quadrature data. An averaging module 108 determines an average of the difference between the autocorrelation of the in-phase data and the autocorrelation of the quadrature data, and an average of the cross correlation between the in-phase data and the quadrature data. The averages are determined over a specified number of data samples. A compensation module 110, based on the average difference between the autocorrelation of the in-phase data and the autocorrelation of the quadrature data, and the average cross correlation between the in-phase data and the quadrature data, determines compensated in-phase data and quadrature data 112 that have reduced IQ mismatch.

In some examples, the compensation module 110 determines the compensated in-phase data and quadrature data 112 based on a least-mean-square algorithm that causes the average cross-correlation between I and Q data to converge towards zero and the average difference of the auto-correlation of I and Q data to converge towards zero. This causes the I and Q data to become orthogonal to each other. By determining compensated in-phase data and quadrature data 112 based on the average difference between the autocorrelation of the in-phase data and the autocorrelation of the quadrature data, and the average cross correlation between the in-phase data and the quadrature data, noise can be suppressed, resulting in lower IQ mismatch in the compensated data.

A control module 114 controls the specified number of data samples over which the difference between the autocorrelation of the in-phase data and the autocorrelation of the quadrature data, and the cross correlation between the in-phase data and the quadrature data are averaged. For example, the control module 114 may set the specified number to a smaller number at the start of the process for compensating IQ mismatch, and later set the specified number to a larger number. By setting the specified number to a smaller number, the least-mean-square algorithm processes data faster at the start of the process. By later setting the specified number to a larger number, the least-mean-square algorithm can further suppress noise, producing more accurate results. In some examples, the control module 114 may control a rate of convergence for the least-mean-square process. The control module 114 may set the rate of convergence to a higher value at the start of the least-mean-square process and later set the rate of convergence to a lower value. This allows the least-mean-square algorithm to converge faster at the start of the process, and later converge more accurately toward the final result.

Figure 2:
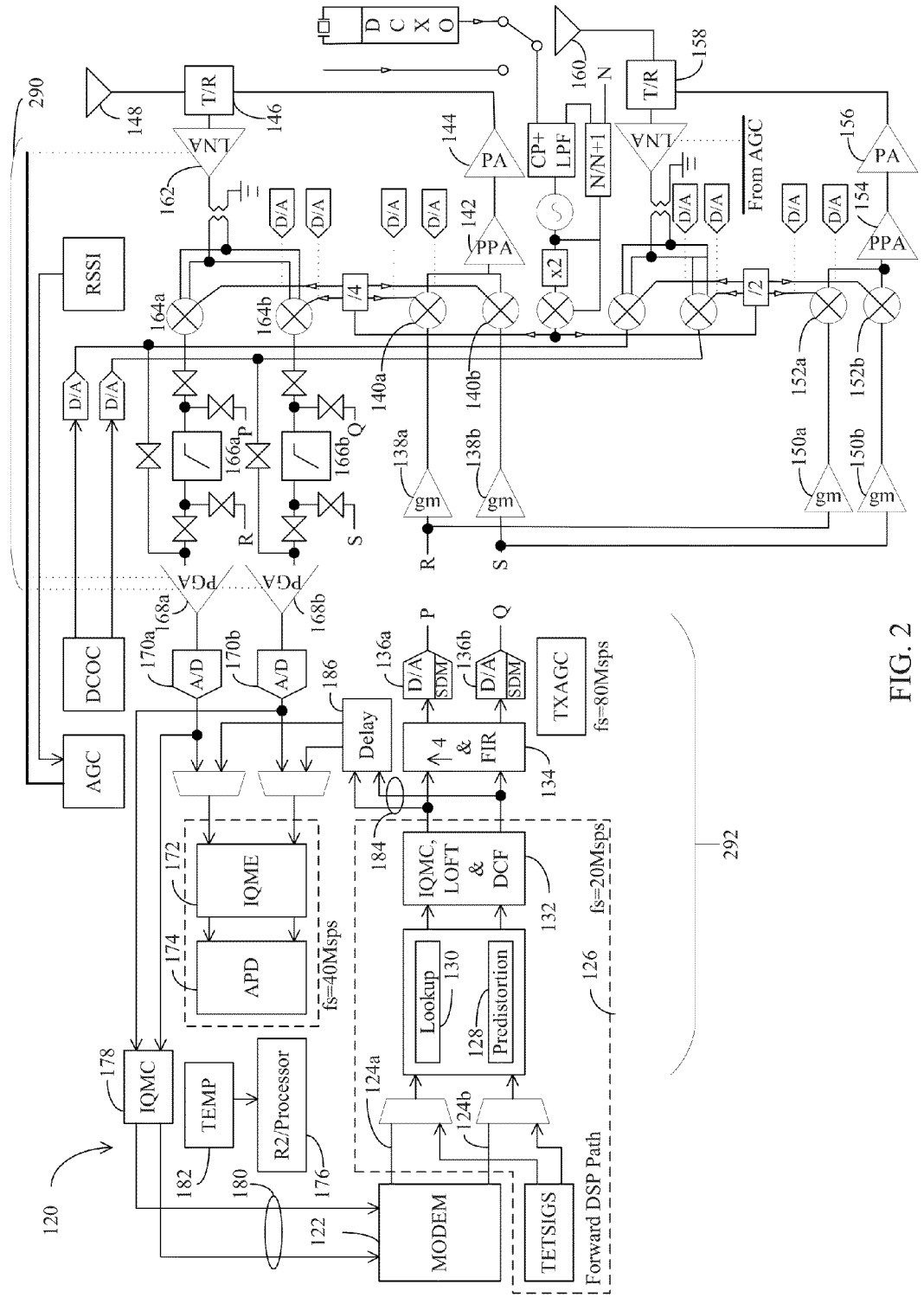
FIG. 2 is a block diagram of an exemplary wireless system that adaptively compensates I-Q imbalance.

Referring to FIG. 2, in some examples, a wireless system 120 includes a transceiver 290 and a pre-distorter 292 that performs IQ mismatch compensation. An IQ mismatch estimator 172 estimates the amount of mismatch between in-phase data and quadrature data and generates coefficients that can be used to compensate the IQ mismatch. The output of the IQ mismatch estimator 172 is used by an IQ mismatch compensation unit 178 to compensate for the IQ mismatch in a received signal. The output of the IQ mismatch estimator 172 is also used by an IQ mismatch compensation unit 132 to compensate for the IQ mismatch in a signal to be transmitted.

In some implementations, the transmitter of the transceiver 290 is initially turned off and the receiver is turned on, and the IQ mismatch estimator 172 estimates the IQ mismatch caused by the receiver based only on the received signal. The IQ mismatch estimator 172 determines the coefficients that can be used to compensate IQ mismatch in the receiver. Next, the transmitter of the transceiver 290 is turned on to transmit a signal, and a portion of the transmit signal is coupled back through the receiver. The IQ mismatch estimator 172 estimates the IQ mismatch caused by the combination of the transmitter and the receiver. The IQ mismatch caused by the transmitter can be determined by subtracting the IQ mismatch caused by the receiver alone from the IQ mismatch caused by the combination of the transmitter and the receiver. The IQ mismatch estimator 172 determines the coefficients that can be used to compensate IQ mismatch in the transmitter.

As described in more detail below, the IQ mismatch estimator 172 determines the coefficients for compensating IQ mismatch based on a least-mean-square algorithm that causes the average cross-correlation between I and Q data to converge towards zero and the average difference of the autocorrelation of I and Q data to converge towards zero. By determining compensated in-phase data and quadrature data 112 based on the average difference between the autocorrelation of the in-phase data and the autocorrelation of the quadrature data, and the average cross correlation between the in-phase data and the quadrature data, noise can be suppressed, resulting in lower IQ mismatch in the compensated data.

The specified number of data samples over which the difference between the autocorrelation of the in-phase data and the autocorrelation of the quadrature data, and the cross correlation between the in-phase data and the quadrature data are averaged can be adjusted. For example, the specified number may be set to a smaller number at the start of the process for compensating IQ mismatch, and later set to a larger number. By setting the specified number to a smaller number, the least-mean-square algorithm processes data faster at the start of the process. By later setting the specified number to a larger number, the least-mean-square algorithm can further suppress noise, producing more accurate results. The specified number can also be adjusted depending on the noise level. The higher the noise level, the larger the specified number.

A modem 122 provides in-phase data 124a and quadrature data 124b to be processed and transmitted. A forward digital signal processing (DSP) path 126 includes a power amplifier pre-distortion circuit 128 that pre-distorts the in-phase data 124a and the quadrature data 124b using information obtained from a lookup table 130. The lookup table 130 stores information on the amount of compensation that needs to be applied to compensate for distortions in the amplifier.

The forward DSP path 126 performs impairment correction of the transmit analog blocks. The power amplifier pre-distortion circuit 128 performs complex gain pre-distortion, in which the power amplifier distortion is modeled as amplitude-to-amplitude modulation and amplitude-to-phase modulation distortions. The pre-distortion circuit 128 compensates the input signals 124a, 124b to emphasize the signals in the regions where the power amplifier is compressed.

The pre-distortion circuit 128 is followed by transmitter distortion correction circuits that add image signal and local oscillation feed-through (LOFT) pre-compensation for the IQ imbalance and the transmitter LOFT. An IQMC (IQ mismatch compensation) unit 132 applies IQ mismatch compensation to generate IQ mismatch compensated in-phase and quadrature data. The IQMC unit 132 also includes a DC filter that removes the DC offset from the pre-distorted in-phase and quadrature data. In this example, the pre-distortion unit 128 and the IQMC unit 132 operates at a sampling frequency of 20 MPs (mega samples per second). The IQ mismatch compensated in-phase and quadrature data are up-sampled by a 4× up-sampler to 80 MHz and filtered by a finite impulse response (FIR) filter 134. In some implementations, after up-sampling, the 80 MHz output is passed through to the later stages of the transceiver 290 using a 12-bit information carrying signal.

The filtered in-phase data and quadrature data are converted to analog signals using digital-to-analog converters 136a and 136b, respectively. The analog in-phase and quadrature signals pass through transconductance amplifiers 138a and 138b, respectively, and are up-converted to radio frequency signals using radio-frequency mixers 140a and 140b, respectively. The radio frequency in-phase and quadrature signals are combined and amplified by a pre-power amplifier 142, then amplified by a power amplifier 144. The amplified signal is sent to a transmit/receive switch 146 and is transmitted through an antenna 148.

In this example, the transceiver 290 operates according to a time-division-duplex communication protocol in which the transceiver 290 is either transmitting a signal or receiving a signal, but not both, at a given time. When the transceiver 290 is receiving a signal, the transmit/receiver switch 146 passes the receive signal from the antenna 148 to a low-noise amplifier (LNA) 162. When the transceiver 290 is transmitting a signal, the transmit/receive switch 146 passes the transmit signal from the power amplifier 144 to the antenna. The transmit/receive switch 146 also parasitically couples the transmit signal back to the low-noise amplifier 162, after which the transmit signal is down-converted and digitized using the analog-to-digital converters 170a, 170b.

When the transmitter is turned on, the received signal (based on the parasitically coupled transmit signal) contains distortions from the transmitter and the receiver. These distortions are removed in the IQ mismatch estimator 172 and the IQ mismatch compensator 178. The digital transmit signal 184 (provided by the IQ mismatch compensation unit 132) is the ideal signal without distortion, so it is used as a reference signal in the learning algorithm used in the IQ mismatch estimator 172 and adaptive pre-distortion unit 174. The reference transmit signal 184 is delayed by a delay unit 186 to match the analog loopback delay before comparing with the receive signal (which is provided by the analog-to-digital converters 170a, 170b0.

In this example, the transceiver 290 is a dual-band transceiver that can operate on two frequency bands. The transconductance amplifier 138a, 138b, the down-converting mixer 140a, 140b, the pre-power amplifier 142, and the power amplifier 144 are used for the first frequency band (e.g., 5 GHz). When the transceiver 290 operates under the second frequency band (e.g., 2.4 GHz), the analog signals from the digital-to-analog converters 136a, 136b are amplified by transconductance amplifiers 150a, 150b, respectively, and converted to radio frequency by using radio-frequency mixers 152a, 152b, respectively. The radio frequency in-phase and quadrature signals are combined and amplified by a pre-power amplifier 154, then amplified by a power amplifier 156. The amplified signal passes a transmit/receive switch 158 and is transmitted through an antenna 160.

In this description, when we say receive a signal and reduce IQ mismatch of the signal, we mean that the signal includes a sequence of data samples, and a first, earlier portion of the data samples is used to determine the coefficients that are used to reduce the IQ mismatch in a second, later portion of the data samples.

When a signal is received at the antenna 148, the received signal passes the transmit/receive switch 146 to the low-noise amplifier (LNA) 162. The signal amplified by the low-noise amplifier 162 is coupled to down-converting mixers 162a and 162b, whose outputs include in-phase and quadrature signals that are sent to high-pass filters 166a and 166b, respectively. The filtered in-phase and quadrature signals are amplified by programmable gain amplifiers 168a, 168b, respectively. The amplified in-phase and quadrature signals are converted to digital form using analog-to-digital converters 170a, 170b, respectively. The digital in-phase and quadrature data are sent to the IQ mismatch estimator 172, which generates coefficients for compensating IQ mismatch, as described above.

Initially, when the transmitter is turned off and the receiver is turned on, the coefficients for compensating IQ mismatch that are generated solely from the received signal is provided to an IQ mismatch compensation module 178 to compensate for IQ mismatch in the receive signal. The IQ mismatch compensated signal 180 is provided to the modem 122. When the transmitter is turned on, and a portion of the transmit signal is coupled back through the receiver to the IQ mismatch estimator 172, the IQ mismatch estimator 172 determines the IQ mismatch caused solely by the transmitter, and determines the coefficients that can compensate for the IQ mismatch in the transmitter. The IQ mismatch compensation unit 132 uses the coefficients to compensate for the IQ mismatch in the transmitter.

The IQ mismatch estimator 172 also provides outputs to an adaptive pre-distortion engine 174 that generates information used by a processor 176 to adaptively adjust the amount of pre-distortion that is applied by the pre-distortion unit 128 to compensate for distortion in the power amplifier.

The processor 176 receives readings from a temperature sensor 182, and uses the temperature information to determine the amount of pre-distortion applied by the pre-distortion unit 128.

A test signal generator 184 generates various test signals, such as ramp, sawtooth and complex exponential waveforms in order to synthesize a calibration signal for performing self-testing. Either the output from the test signal generator 184 or the modulation waveform generated from the modem 122 can be used as an input to the digital front end (which includes the forward DSP path 126). This allows flexibility in calibration signal selection. Because the test signal generator 184 can provide test signals independently of the modem, it is useful during a debugging process to allow engineers to identify problems based on known test signals. When a ramp or a sawtooth signal is used as a calibration signal, it spans the entire dynamic range of the power amplifier input and takes the power amplifier into the region of compression.

One of the advantages of the system 120 is that the coefficients for compensating IQ mismatch are determined based on the average cross-correlation between I and Q data and the average difference of the auto-correlation of I and Q data, instead of the instantaneously values of the cross-correlation between I and Q data and the difference of the auto-correlation of I and Q data. By using the average values instead of the instantaneous values, better noise suppression can be achieved. By adjusting the number of samples over which the average values are computed, adaptive IQ mismatch compensation can be achieved to accommodate a variety of situations. For example, the number of samples may be set to a smaller number so that the computation can be executed faster, or set to a larger number to increase noise suppression.

Figure 3:
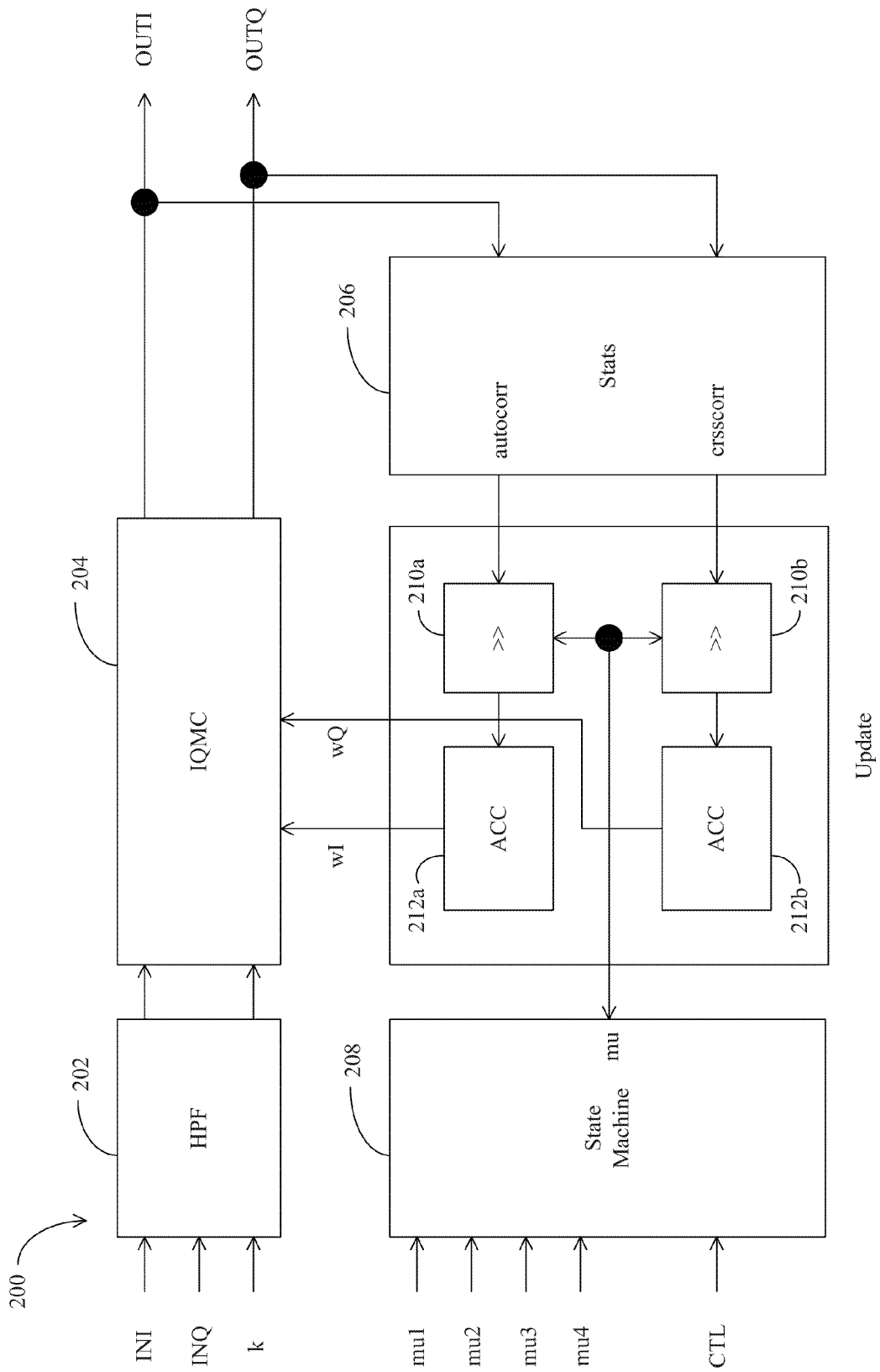
FIG. 3 is a block diagram of an exemplary circuit for eliminating the IQ imbalance and the DC offset from the received signal.

Referring to FIG. 3, a block diagram of a circuit 200 for eliminating the IQ imbalance and the DC offset from the received signal is provided. For example, the circuit 200 can be part of the IQ mismatch estimator 172 in FIG. 2. A programmable digital high pass filter (HPF) 202 removes the DC offset from the received signal (represented as In_I and In_Q) using a single pole infinite impulse response (IIR) filter with a programmable corner frequency. For example, the lowest corner can be selected to be 100 kHz. An IQ mismatch compensator (IQMC) circuit 204 removes the estimated image signal added by the mixer in the receiver. The output from the IQ mismatch compensator circuit 204 is used by a statistics unit 206 to calculate the difference between the auto-correlation of I and Q signals and the cross-correlation between the I and Q signals. A state machine 208 selects a $\mu$ value that controls the gain (applied by gain units 210a and 210b) before the auto-correlation and cross-correlation values are accumulated by accumulators 212a and 212b, respectively. The outputs wI and wQ of the accumulators 212a and 212b, respectively, are used to update weight values used by the IQ mismatch compensator circuit 204.

On convergence, the difference in the auto-correlation and the cross-correlation between the I and Q signals at the IQ mismatch compensator output are both forced to zeros. Thus, correct image compensation power is computed, and the image is removed at the output. The value of $\mu$ can be "gear-shifted" between preset $\mu 1$ to $\mu 4$ values, in which a larger value can be selected to achieve faster convergence, and a smaller value can be selected to achieve more accurate convergence. As an alternative to dynamic updates, the values computed by the statistic unit 206 can be directly used by an embedded processor to compute the wI and wQ values to eliminate IQ imbalance based on one-shot estimation.

When the transmitter is powered off, the receiver uses the IQ mismatch estimator module 172 to estimate the IQ imbalance due to the receiver. The value thus obtained can be stored in the memory and used in the initialization of wI and wQ signals for compensating the IQ imbalance of the receiver.

When the transmitter is turned on, local oscillator feed through and imbalance due to transmitter mixer appear at the receiver analog-to-digital converter output. The difference between I and Q auto-correlations and the I and Q cross-correlation indicate the IQ imbalance introduced due to the transmitter. When IQ mismatch estimator unit 172 settles, OUTI and OUTQ have the same power and are orthogonal to each other and the image signal is eliminated. Thus, the signal is free of distortions other than those from the amplitude-to-amplitude modulation and amplitude-to-phase modulation.

The feedback path uses the receiver to compute the updates to the forward compensation path. In addition, it provides IQ mismatch estimation for the receiver along with IQ mismatch compensation. The output of the IQ mismatch compensator 178 provides IQ data to the modem 122. The IQ mismatch estimator 172 performs estimation of IQ imbalance using a blind approach and provides the corrected data to the adaptive pre-distortion estimation engine 174.

The feedback signal can be selected to be either the analog-to-digital converter output (in normal operation) or the output of the forward compensation path (in debug mode). When the forward path is looped back, we can use the signal processing blocks in the forward path to introduce degradation in the signal. The reference signal is fed into the delay match block 186, which is programmed to provide the same delay to the reference (the ideal transmit signal) as experienced by the distorted signal. Thus, the feedback path takes two signal inputs: the ideal transmit reference signal and the distorted input from either the analog-to-digital converters 170a, 170b or the forward path. Thus a built-in self-test function can be performed in the final form factor using the digital loopback. The forward path introduces an IQ imbalance (e.g., generated by the IQ mismatch compensation unit 132), while the IQ mismatch estimator 172 estimates it. On convergence, the solution can be compared against the introduced distortion to test this block in the final form factor.

The following describes the IQ mismatch compensator 178. The signal processing provided to the receive data is IQ mismatch compensation provided by the IQ mismatch compensator 178. An image is subtracted from the received signal to yield a compensated output. In some examples, the operations can be performed with 12-bits of resolution. The IQ mismatch compensator performs the operation y=x−w·x*, that is $$y_I + j \cdot y_Q = (x_I + j \cdot x_Q) - (w_I + j \cdot w_Q) \cdot (x_I - j \cdot x_Q)$$

In the above equation, the an image of the signal $x_I + j \cdot x_Q$ is determined by multiplying a conjugate of the signal $(x_I - j \cdot x_Q)$ with a weight value $(w_I + j \cdot w_Q)$, and then the image is subtracted from the signal. The weight (wI, wQ) is written through registers (e.g., reg_iqmc_w_i and reg_iqmc_w_q) and represents the estimated image signal. As a result of this operation, any DC offset at the input will be augmented by its image offset weighted by this weight.

The offset can be corrected by the modem 122. If the offset becomes a problem, a DC notch (described below) can be used to provide DC notching for the receive path.

Figure 4:
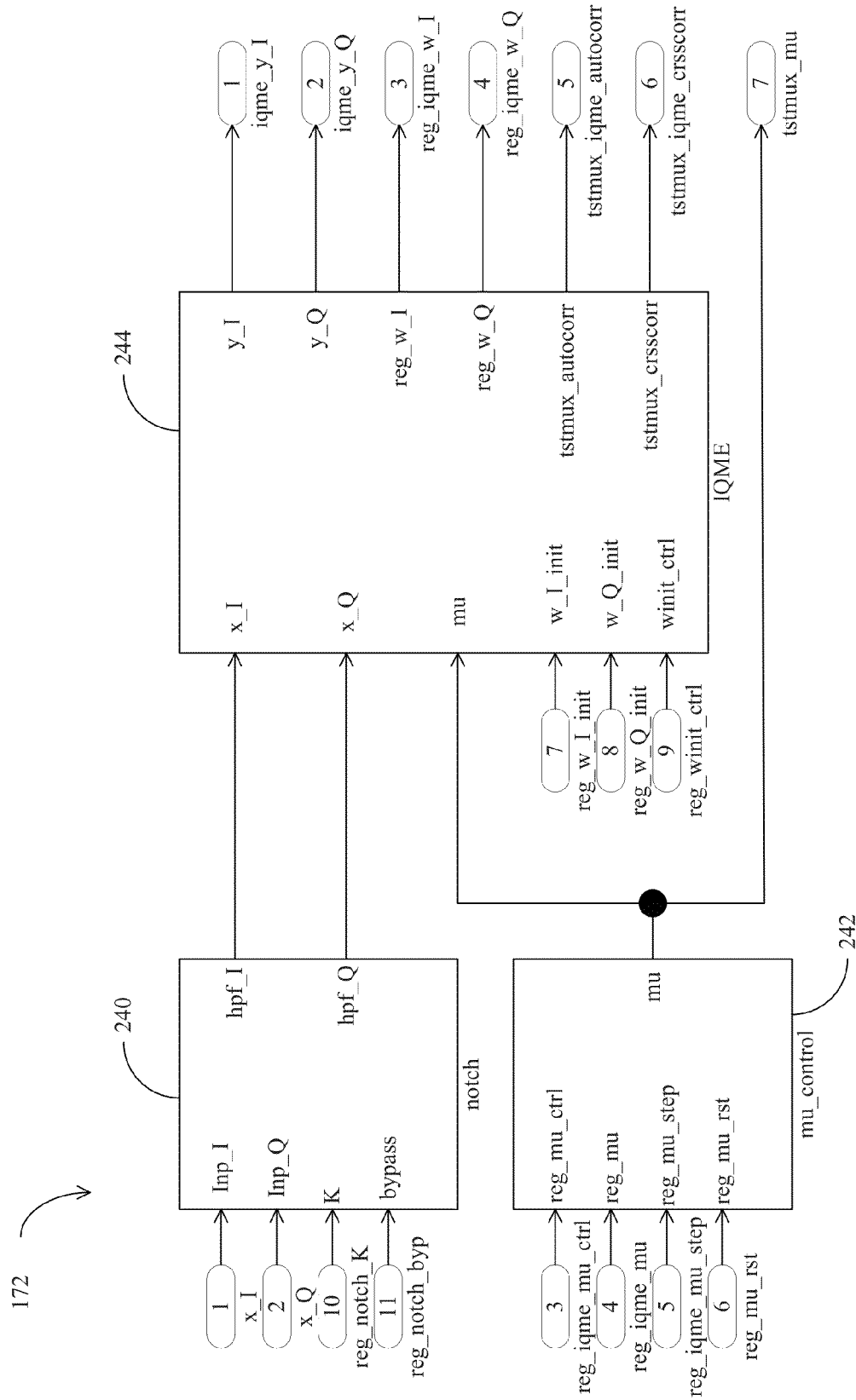
FIG. 4 is a block diagram of an exemplary IQ imbalance estimator circuit.

Referring to FIG. 4, the IQ imbalance estimator 172 includes a notch filter 240, a μ control unit 242, and an IQ mismatch estimation unit 244. The IQ mismatch estimator 172 can estimate the IQ imbalance in the received signal, which can either be from the output of the analog-to-digital converter 170 or the forward path output (using digital loopback). The IQ mismatch estimator 172 uses a least-mean-square algorithm that forces the cross-correlation between I and Q inputs towards zero and also the difference of the auto-correlation of I and Q inputs towards zero. This forces I and Q to become orthogonal to each other.

In FIG. 4, signals with 'reg_' in the beginning come from control registers that can be used to program the parameters of the block these signals enter. The signals at the output with 'reg_' preceding the name are register values that provide computed outputs.

The signals (x_I, x_Q) are the input signal having IQ imbalance, and the signals (iqme_y_I, iqme_y_Q) are the compensated signals. Some signals initialize registers, and some signals provide intermediate signals for observation on a test multiplexer.

After passing through the notch filter 240, the input signal is free of DC offset. The IQ mismatch estimation unit 244 starts its computations. The μ control unit 242 can be used to step through μ values for the least-mean-square algorithm in the IQ mismatch estimation unit 244 without any intervention from the processor. Alternatively, using software support, the register reg_iqme_mu can be used to dynamically vary the value of μ used by the least-mean-square algorithm. There are tradeoffs for using different μ values. For example, the μ, value can be determined based on the required settling time for the least-mean-square algorithm.

The IQ mismatch estimation unit 244 computes the weight that can be used by the IQ mismatch compensator 178 in the receive path to eliminate the image. In some examples, this operation may need software support to start IQ mismatch estimation operation, read out the estimates from the IQ mismatch estimation unit 244 on completion, and write the weight values to the IQ mismatch compensator 178 when the receive path is not processing the payload.

The transfer function of the notch filter 240 can be programmable and given as $$H(z) = (1 - 2^{-K-1}) \frac{(1 - z^{-1})}{1 - (1 - 2^{-K})z^{-1}}.$$

For example, the variable K can be varied from 0 to 7 using the register reg_notch_K.

Figure 5:
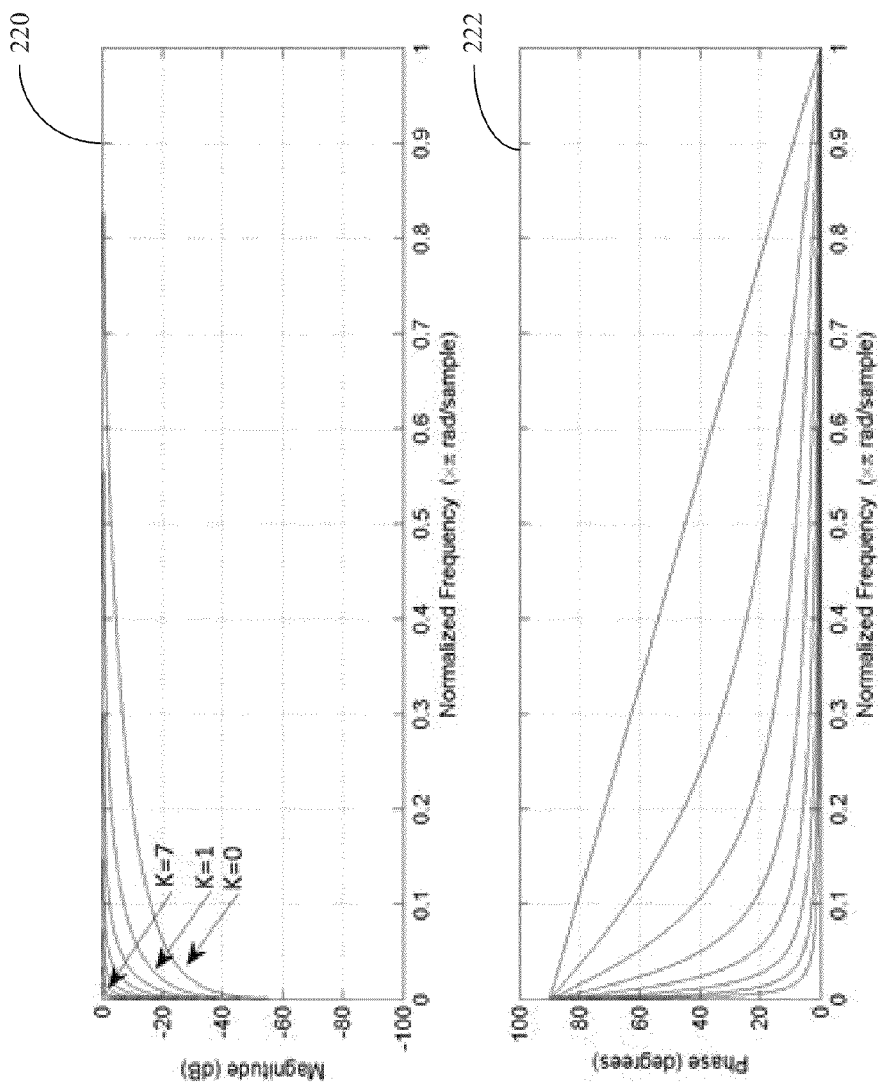
FIGS. 5 and 6 include graphs of exemplary frequency responses of a notch filter.

Referring to FIG. 5, the notch filter can have a frequency domain response shown in graphs 220 and 222.

Figure 6:
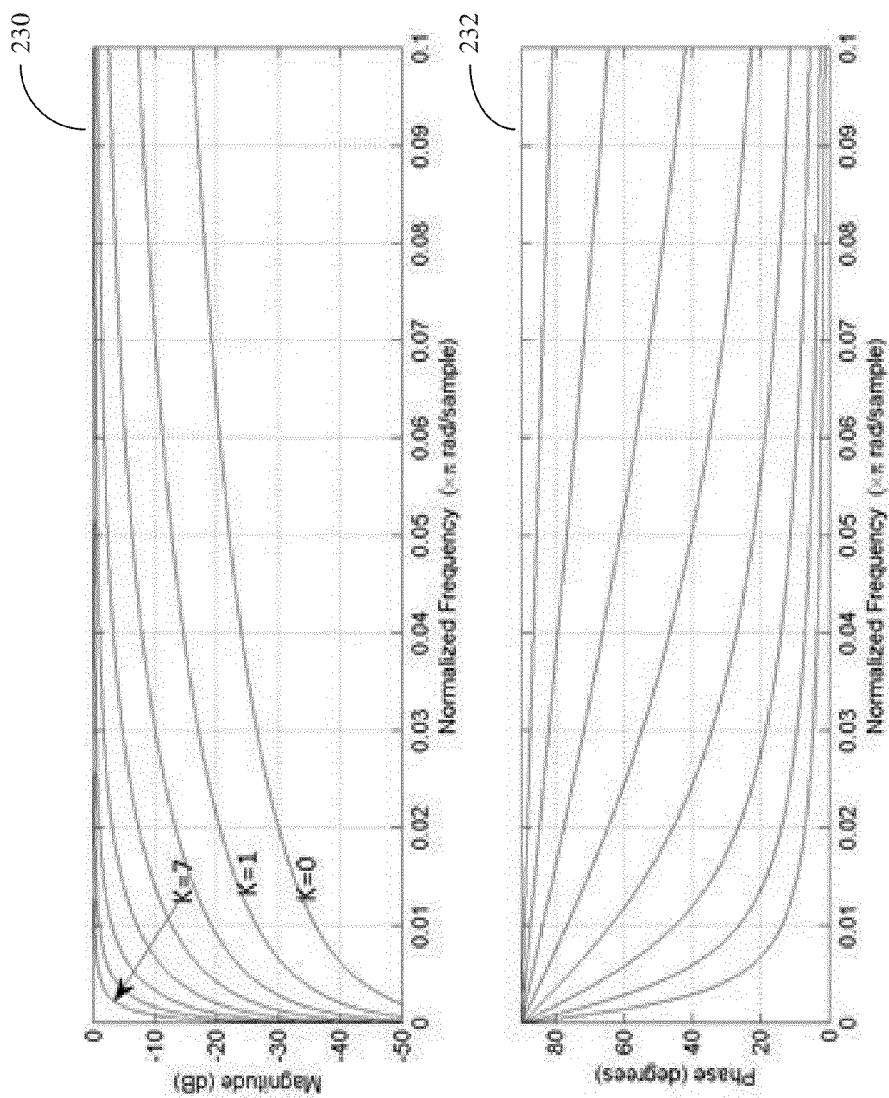

Referring to FIG. 6, the frequency response of the notch filter in the range of normalized frequency 0 to 0.1 is shown in graphs 230 and 232. The variable K can be "gear-shifted" using the settings of the register reg_notch_K to obtain faster settling. For example, this tuning of settling time can be exercised using software support.

For K=7, the normalized 3 dB corner frequency is equal to 0.0025, which is equal to 100 KHz for sampling frequency 80 MHz, and 25 KHz for sampling frequency 20 MHz. The notch filter is implemented to provide unity gain across all values of K.

Table 1 below shows the −3 dB corner values versus K for the DC notch filter.

TABLE 1

| K | Normalized frequency for -3 dB | Comments |
|---|---|---|
| 0 | 0.5 (i.e. fs/4) | Fastest settling time |
| 1 | 0.205 | |
| 2 | 0.09 | |
| 3 | 0.0425 | |
| 4 | 0.02 | |
| 5 | 0.01 | |
| 6 | 0.005 | |
| 7 | 0.0025 | Lowest corner frequency |

After passing through the DC notch filter 240, the input receive signal is passed to the IQ mismatch estimation unit 244. The IQ mismatch estimation unit 244 can be run using a static programmable μ, value or by dynamic μ adjustment (e.g., using register reg_iqme_mu) to provide superior convergence properties. The dynamic μ adjustment can be provided through a state machine. The static μ can be controlled by the processor and can also be dynamically varied by writing software on the processor to control and readjust μ.

Figure 7:
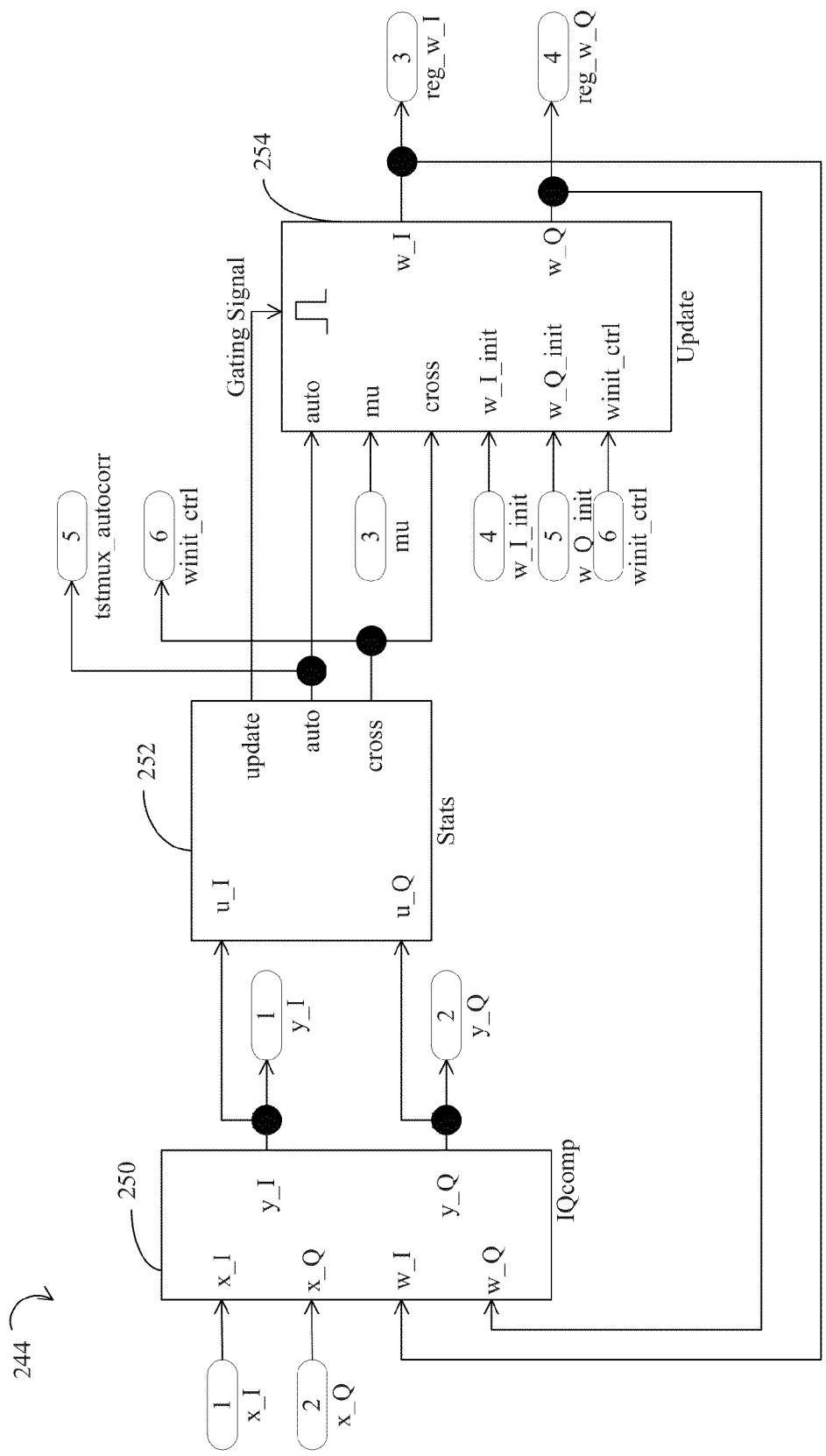
FIG. 7 is a block diagram of an exemplary IQ mismatch estimation unit.

Referring to FIG. 7, the IQ mismatch estimation unit 244 includes a first stage IQ compensation unit 250 that corrects for IQ imbalance using the coefficients from the update block. A statistics block 252 computes cross-correlation and the difference between the auto-correlation of I and Q inputs. Note that the DC offset has been removed using the programmable notch filter 240 in FIG. 4. The statistics estimated are averaged over, e.g., 128 symbols to reject noise and add robustness. The number of symbols over which the averaging is performed can be made programmable to achieve noisy but faster convergence initially, and more accurate final convergence later by adaptively programming the number of samples smaller initially and larger subsequently.

The outputs of the statistics block 252 are streaming signals that can be observed using a test multiplexer. The outputs of the statistics block 252 are provided to the output through "tstmux_autocorr" and "tstmux_crsscorr" signals. These signals can be provided to comparators that may trigger a control signal to the microprocessor when these signals fall below a programmed threshold value. This allows the processor to control the time of convergence based on the actual behavior of data rather than fixed time intervals.

The estimates from the statistics block 252 are passed on to the update block 254, which is enabled after 128 cycles using the update signal provided from the statistics block 252.

Figure 8:
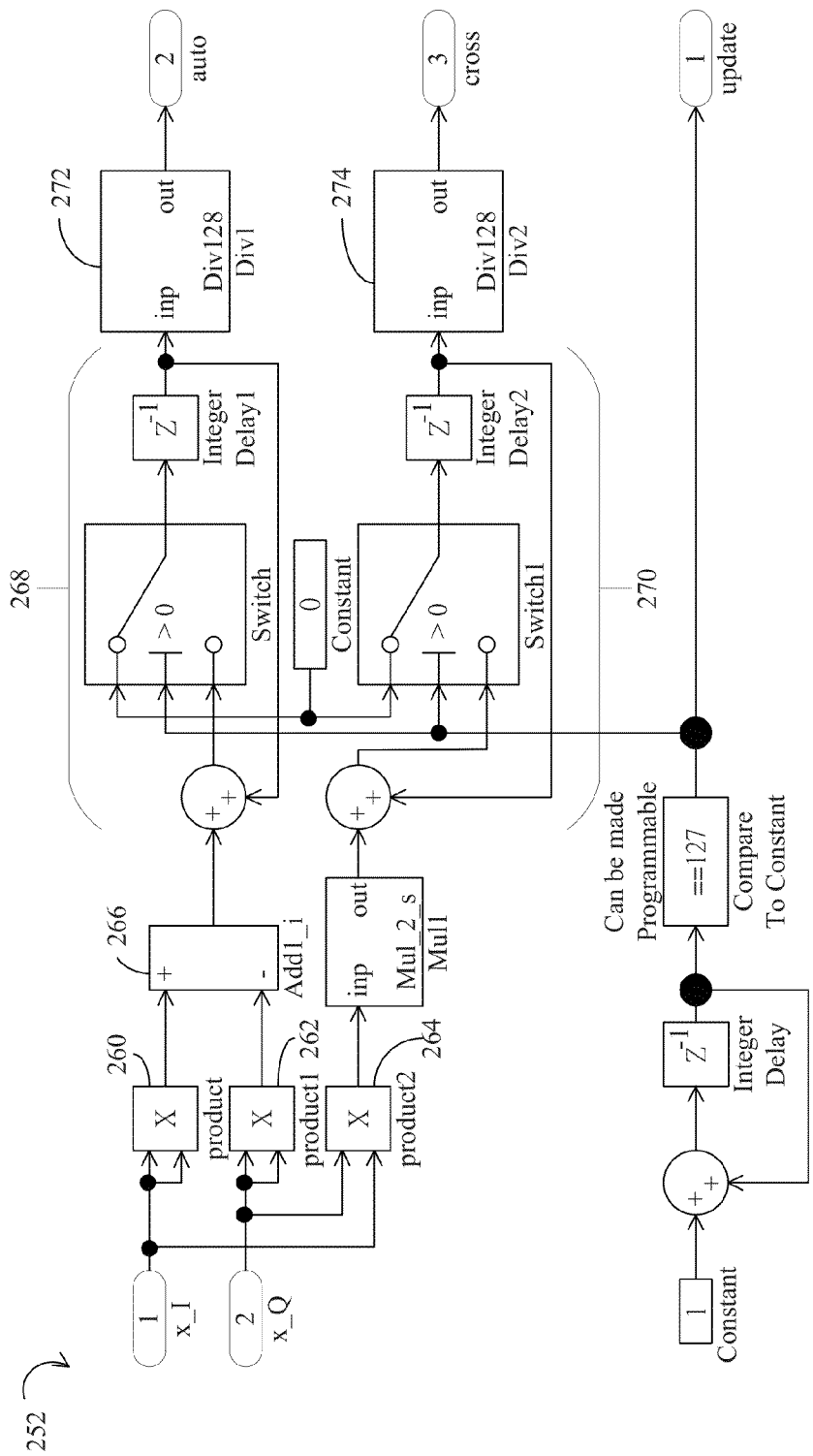
FIG. 8 is a block diagram of an exemplary statistics unit.

Referring to FIG. 8, statistics unit 252 includes a first auto-correlation unit 260 that calculates the auto-correlation of the I signal, a second auto-correlation unit 262 that calculates the auto-correlation of the Q signal, and a cross-correlation unit 264 that calculates the cross-correlation between the I and Q signals. A difference unit 266 calculates the difference between the auto-correlations of the I and Q signals. A first accumulator 268 calculates the sum of the difference between the auto-correlations of the I and Q signals over 128 symbols. A second accumulator 270 calculates the sum of the cross-correlation of the I and Q signals over 128 symbols. A first divider 272 calculates the average of the difference between the auto-correlations of the I and Q signals, and a second divider 274 calculates the average of the cross-correlation of the I and Q signals. The divider 272 can be easily modified to divide the input by a programmable number of samples; the same programmable number of samples can be accumulated. The example in FIG. 8 shows accumulation of 128 samples and therefore, divide by 128. However, a programmable number of samples may be accumulated and the sum normalized through a divide operation. Power of 2 number of accumulated samples are quite easy to normalize using a right shift operation in the divider 272.

Figure 9:
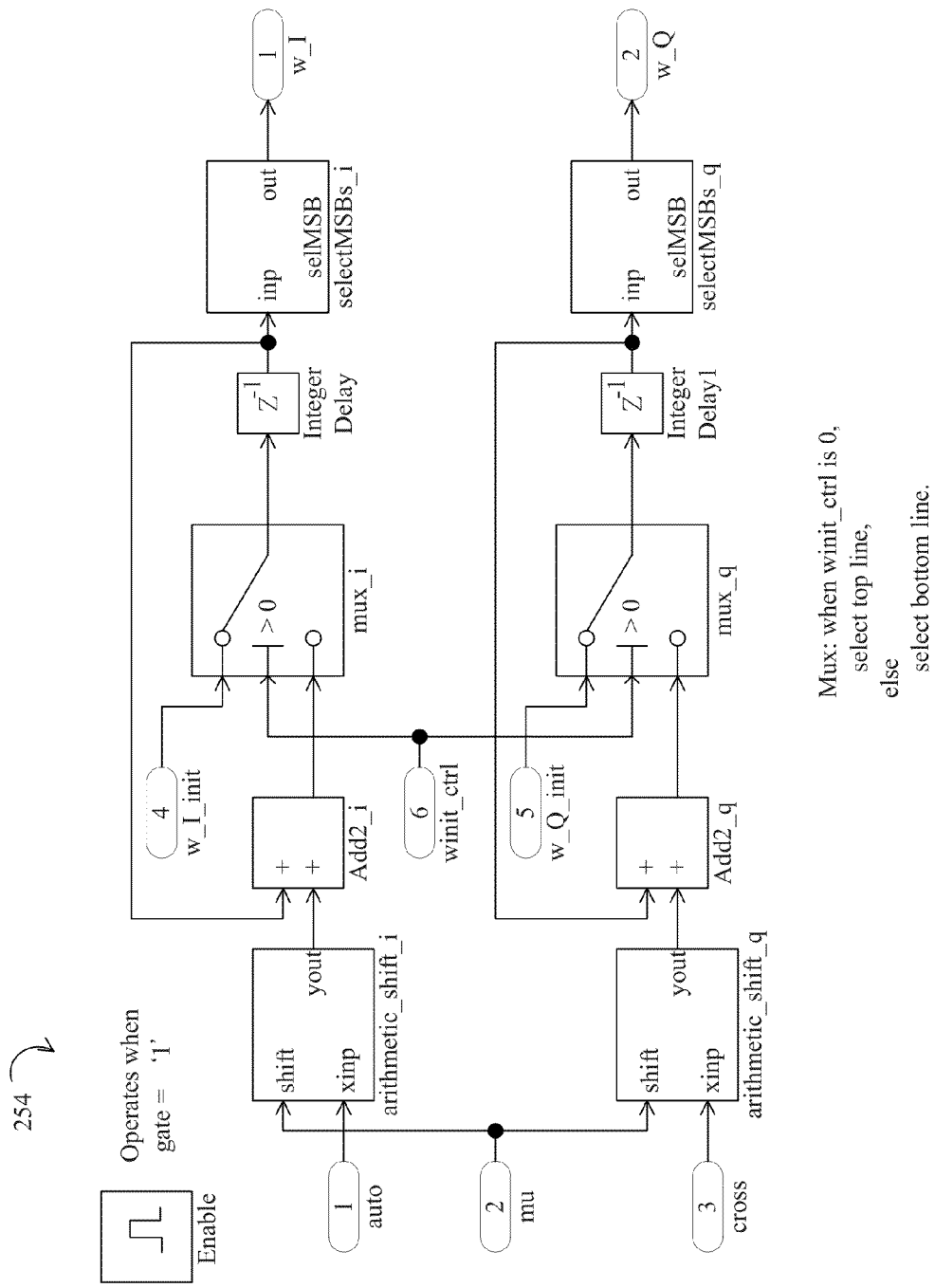
FIG. 9 is a block diagram of an exemplary update unit.

Referring to FIG. 9, the estimates (average auto-correlations and average cross-correlation) from the statistics block 252 are passed on to the update block 254, which is enabled after 128 cycles using the enable signal (the update signal) provided from the statistics block 252. The averaging of estimates over 128 samples reduces noise and provides a very robust and stable operation at the cost of longer convergence time. This is a reasonable initial solution aimed at quality and robustness of results rather than speed of operation. In some examples, the IQ mismatch estimation operation can be performed with good signal-to-noise ratio (e.g., greater than 30 dB) of the receive signal.

If the averaging is removed, the updates occur very quickly, but the noise is much higher and impacts settling behavior. Because IQ mismatch estimation is performed outside of the signal path, the only cost of slower but more robust operation is the power consumption incurred during the settling (which is faster due to absence of excess noise). Furthermore, each time the IQ mismatch estimator 172 is restarted during normal operation, it starts from its previous converged value and goes to the next value using the noise-filtered values from the statistics block 252.

Initial values for (w_I, w_Q) can be programmed into the update block 254 to use the IQ compensator 250 as a secondary IQ mismatch compensator, similar to the primary IQ mismatch compensator 178 for the receive path. The initial values are programmed through registers reg_w_i_init and reg_w_q_init under the control of the register reg_winit_ctrl.

Figure 10:
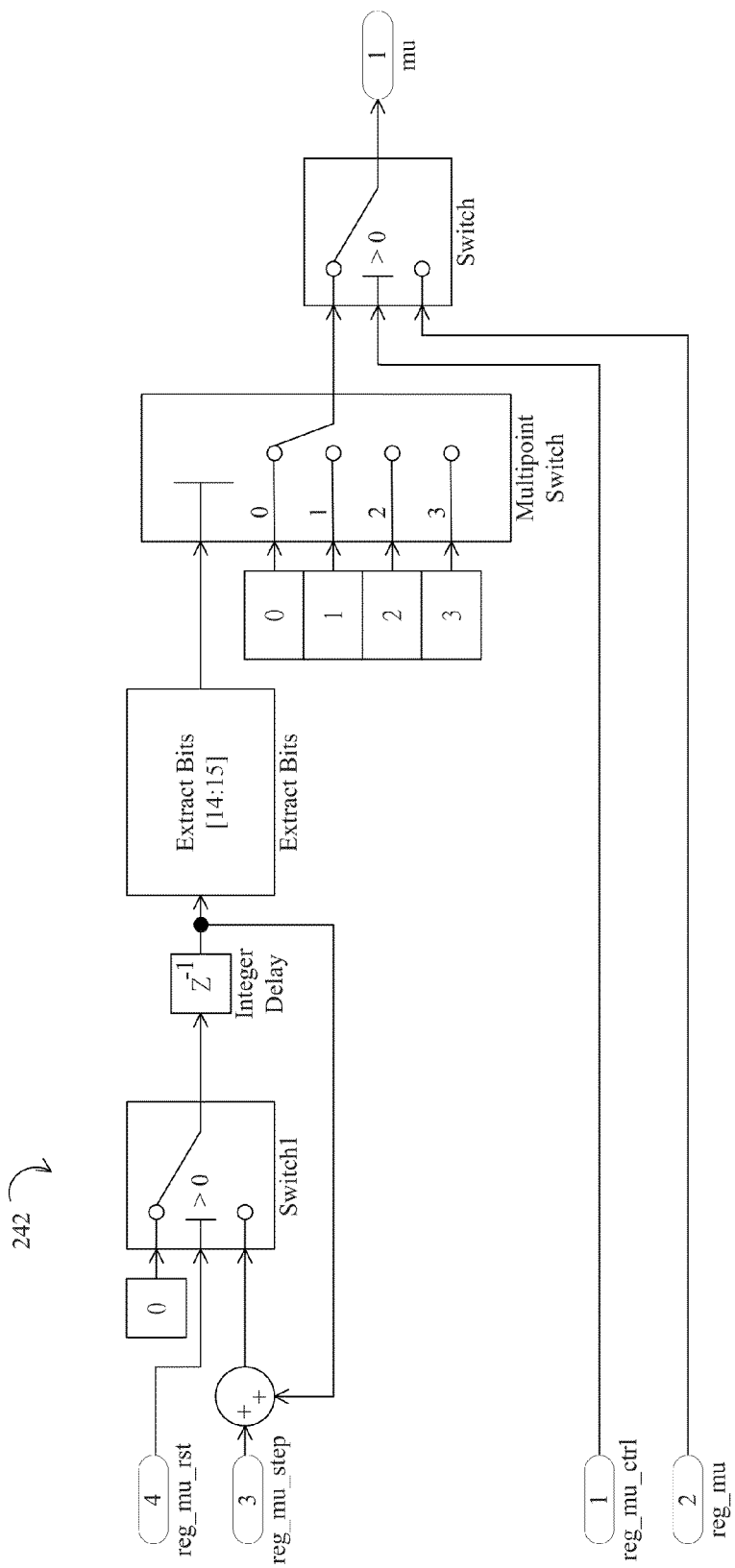
FIG. 10 is a block diagram of an exemplary mu control unit.

Referring to FIG. 10, the μ control unit 242 provides dynamic μ control using gear-shifting under state machine control that can assist faster convergence of the IQ mismatch estimation unit 244 (FIG. 4). The dynamic μ control unit 242 is implemented to relieve the software from dynamically controlling the value of the register reg_dspfb_mu for the IQ mismatch estimation unit 244 and steps through μ from 0 to 3 under the timing control from the register reg_mu_step.

The two most significant bits (MSBs) of a 16-bit counter steps μ from 0 to 3. If more time is allowed, a smaller value can be programmed in the register reg_iqme_mu_step. The counter can be reset using the register reg_mu_rst under software control before starting the IQ mismatch estimation operation under this state-machine.

The following describes signal conditioning for the adaptive pre-distortion engine 174. IQ mismatch compensated input are provided to the adaptive pre-distortion engine 174. The IQ mismatch compensator (IQcomp) block 250 (FIG. 7) in the IQ mismatch estimation block 244 is used by the IQ mismatch estimation engine 244 to compute the corrected signal on which the statistics are estimated for the least-mean-square algorithm. When the IQ mismatch estimation unit 244 has completed its operation and has converged, its local IQ mismatch compensation engine (IQcomp) 250 provides IQ mismatch compensated values that can also be used by the adaptive pre-distortion algorithm. These are the (y_I, y_Q) outputs of the IQ compensator 250 in FIG. 7.

The reason for providing an independent IQ mismatch compensator block 250 for the receive data is that it allows the IQ mismatch estimator 172 to operate independent of the main IQ mismatch compensator block 178 that operates on the receive signal path. If a single IQ mismatch compensator block is used, when the least-mean-square algorithm updates its coefficients, the error in the settling of the least-mean-square algorithm will be propagated to the receive data and degrade the bit error rate (BER) performance, which would be unacceptable. Thus, an independent IQ mismatch compensator block 250 resides inside the IQ mismatch estimation engine 244 and can be used, alternatively, to provide IQ mismatch corrected I and Q data to the adaptive pre-distortion engine 174. The DC notch filter 240 eliminates any residual DC offsets from the analog path. Since the notch is a robust DC removal method and the averaging in the statistics block 252 provides robust IQ mismatch estimation updates when the receive signal has reasonable signal-to-noise ratio, this architecture adds robustness to the adaptive pre-distortion approach.

The following describes system identification and inverse system modeling.

Figure 11:
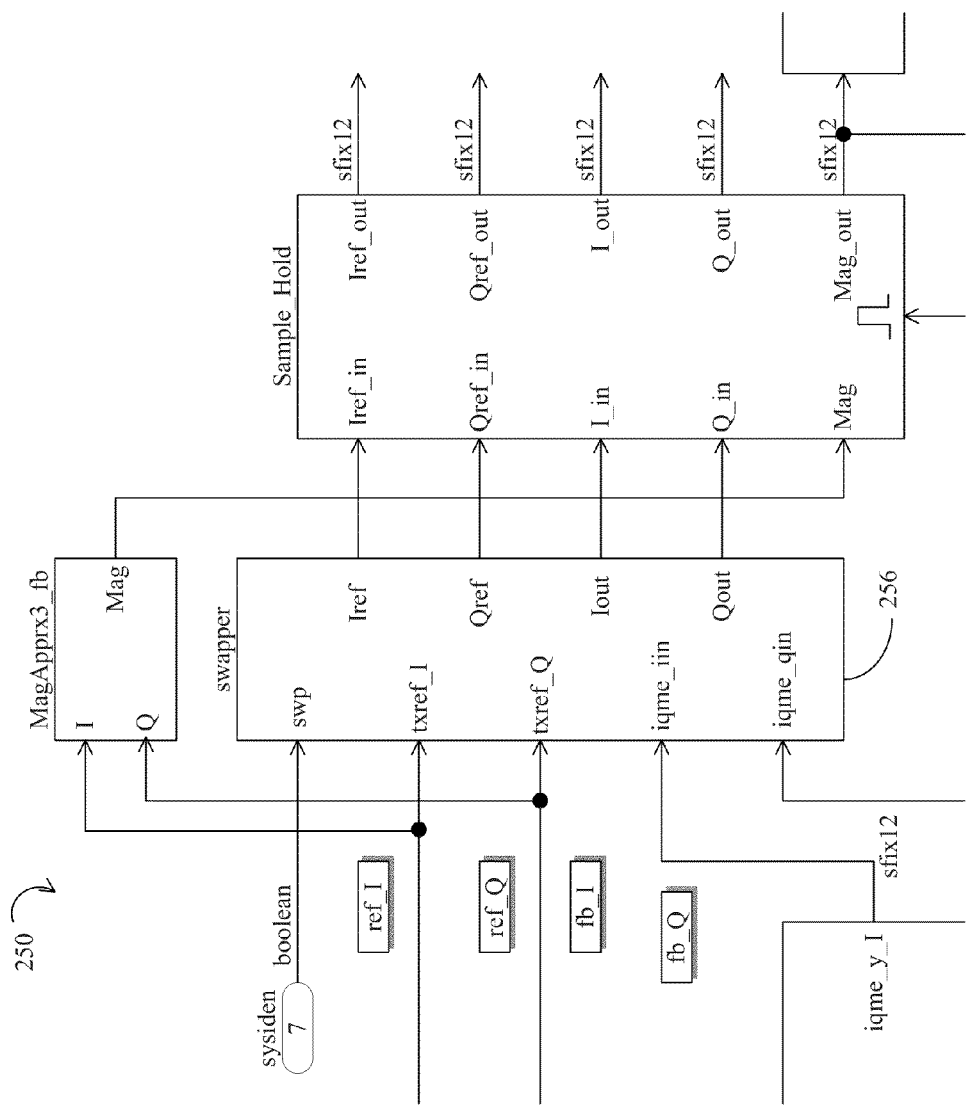
FIG. 11 is a block diagram of an exemplary circuit for controlling the input to the adaptive pre-distortion unit.

Referring to FIG. 11, a circuit 250 for controlling the input to the adaptive pre-distortion engine 174 is provided. In some implementations of the adaptive pre-distortion, the analog path is modeled as a complex gain pre-distorter. In this example, the signal dynamic range is divided into 32 regions and the complex gain weighting due to power amplifier distortion is estimated independently for each signal region. Owing to the distortion model, the compensation is obtained by dividing the received signal in a particular region by the reference signal in the same region. The result obtained is averaged to reject noise.

This approach compares two signals and computes complex A/B, so we can either compute A/B or B/A by swapping the inputs at the two input terminals. This operation is performed by a swapper 256 under the control a register reg_dspfb_sysiden. The signal binning is performed using the reference signal using a low complexity IQ to envelope estimator.

If μ is to be provided directly from the processor, the registers reg_iqme_mu ctrl and reg_iqme_mu are used to control the IQ mismatch estimation operation.

Figure 12:
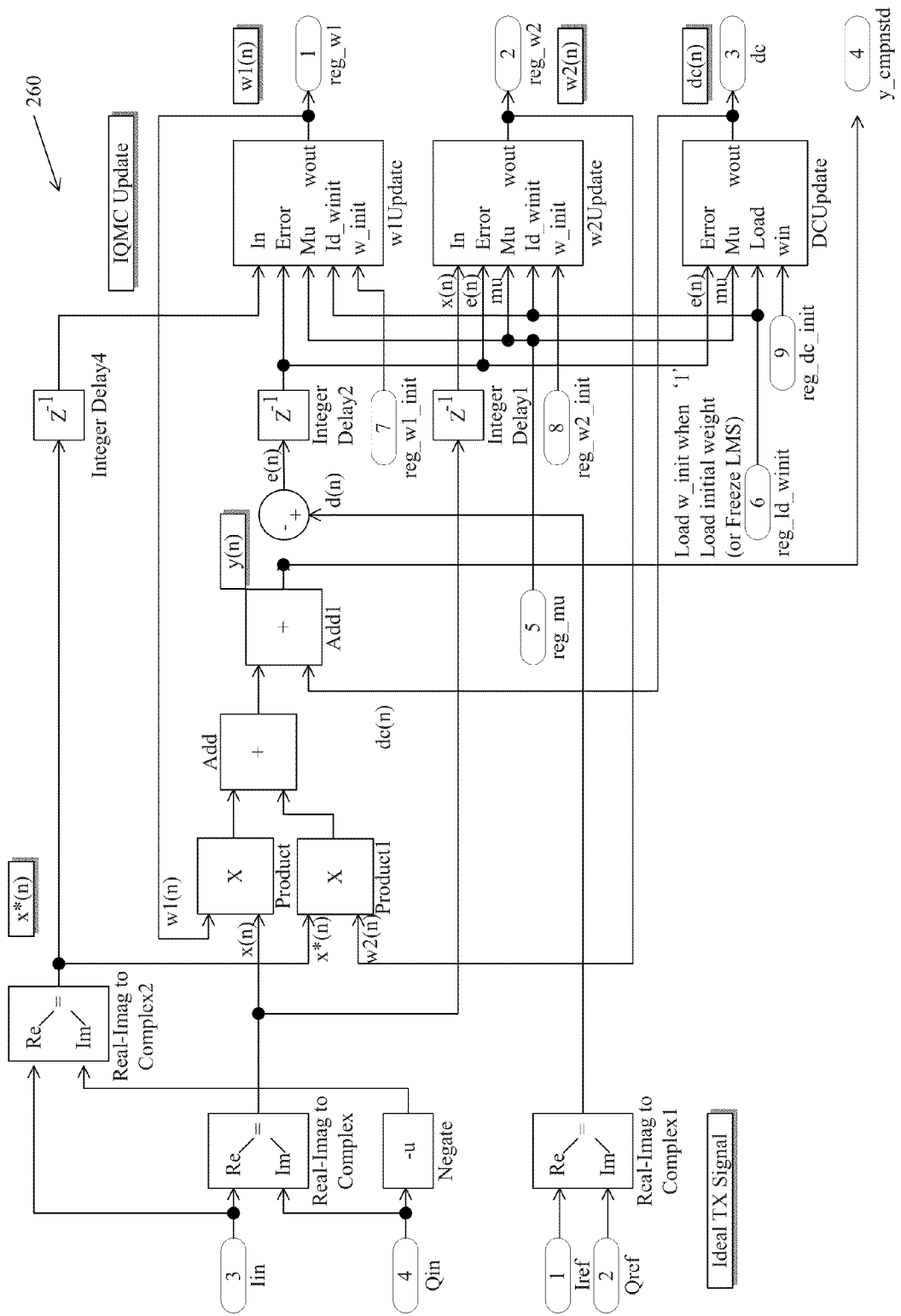
FIG. 12 is a block diagram of an exemplary IQ mismatch estimator.

Referring to FIG. 12, in some examples, an IQ mismatch estimator 260 uses a direct implementation of the least-mean-square algorithm based joint IQ imbalance and DC offset compensation. This is an alternative embodiment of IQ mismatch estimation together with dc offset. In this approach, we can replace the notch filter 240 and the IQ mismatch estimation unit 244 in FIG. 4 with the circuit 260 shown in FIG. 12. The input signal containing dc offset and IQ imbalance is represented as $$x(n)=I\text{in}+jQ\text{in}.$$

The reference input is the delay balanced ideal transmit signal represented as $$d\text{ref}(n)=I\text{ref}+jQ\text{ref}.$$

This reference signal can be the ideal signal from the modem 122 and is delayed to match the round trip delay of the distorted signal such that both are time aligned and the samples can be compared against each other to estimate distortion. In the following, the coefficient w1 represents the complex gain of the system, and the coefficient w2 represents the coefficient of the image signal. The signal dc is the DC offset. Therefore, this approach automatically computes the loop gain from the digital output (to DAC) back to the digital output of the ADC on the feedback path. It also includes the phase rotation of x(n) versus dref(n) incurred in the transmit and receive mixers.

The complex coefficients w1, w2 and dc are simultaneously estimated. This is a joint estimation process in which we try to search for w1, w2 and dc that force the error signal towards zeros in a mean square sense. As we estimate the dc, therefore, the high pass filter preceding the IQ mismatch compensator 178 is no longer necessary as the adaptation searches for both DC as well as w1 and w2. The IQ imbalance is given as w2/w1 and the normalized dc is given as dc/w1. The compensated signal is represented as $$y(n)=w_1(n)\cdot x(n)+w_2(n)\cdot x^*(n)+dc$$

in which $$w_1(n+1)=w_1(n)+\mu \cdot e(n)\cdot x(n)$$

$$w_2(n+1)=w_2(n)+\mu \cdot e(n)\cdot x(n), \text{ and}$$

$$dc(n+1)=dc(n)+\mu \cdot e(n).$$

The term e(n) represents a difference between the delayed balanced ideal transmit signal and the compensated signal, and can be represented as:

$$e(n)=d_{ref}(n)-\{w_1(n)\cdot x(n)+w_2(n)\cdot x^*(n)+dc(n)\}$$

The IQ mismatch estimator 260 of FIG. 12 may have a larger variation in settling because no statistical averaging is performed as in the IQ mismatch estimator shown in FIGS. 2-4, 7, and 8. In the presence of large dc, the convergence becomes slower. The convergence is improved by using a high-pass filter to precede this estimator. The corner frequency of the high-pass filter can be made large for fast settling and it limits the DC offset from entering this estimator and achieves superior convergence. Hence, the preceding high-pass filter can be tuned to settle fast, while leaving some error at its output which is eliminated by the proposed alternative embodiment shown in FIG. 12. The output y_cmpnstd has no IQ imbalance or DC offset after convergence.

An advantage of the scheme shown in FIG. 12 is that it can be used to compute the loop gain from the DAC to the ADC as well as the phase rotation in the two mixers. Thus, this approach provides functions more than IQ mismatch estimation.

Figure 13:
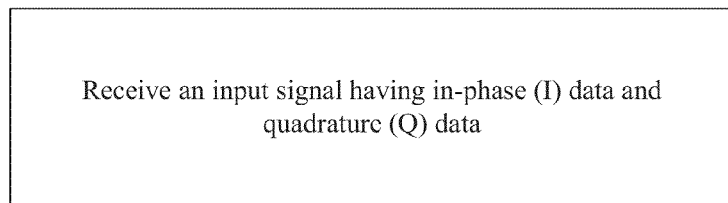
FIG. 13 is a flow diagram of a process for compensating IQ mismatch.
Figure 13:
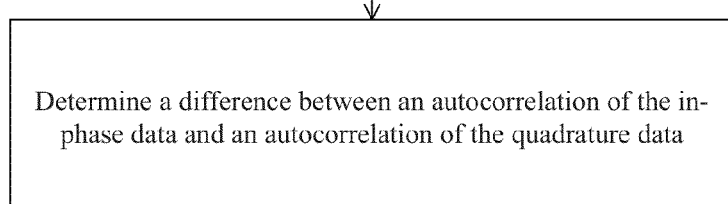
Figure 13:
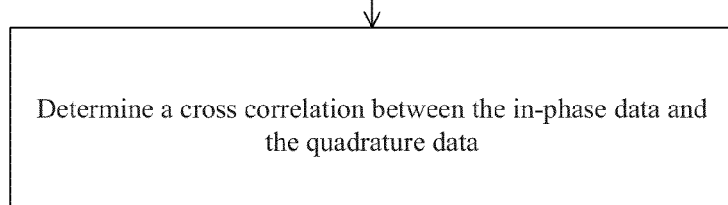
Figure 13:
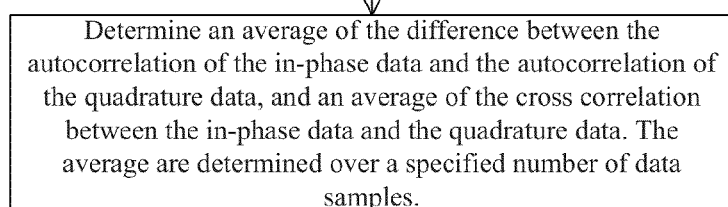
Figure 13:
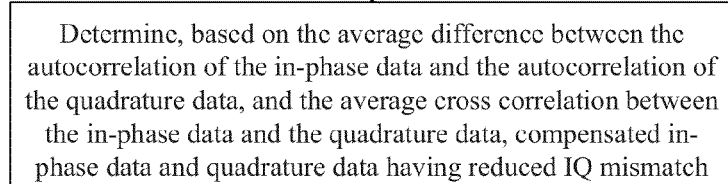

FIG. 13 is a flow diagram of a process 270 for compensating IQ mismatch. For example, the process 270 can be implemented using the system 100 (FIG. 1) or system 120 (FIG. 2). In the process 270, an input signal having in-phase (I) data and quadrature (Q) data is received (272), in which the first signal includes several data samples. A difference between an autocorrelation of the in-phase data and an autocorrelation of the quadrature data is determined (274). A cross-correlation between the in-phase data and the quadrature data is determined (276). For example, the difference between the autocorrelation of the in-phase data and the autocorrelation of the quadrature data, and the cross-correlation between the in-phase data and the quadrature data, can be calculated by the statistics unit 252 of FIGS. 7 and 8. An average of the difference between the autocorrelation of the in-phase data and the autocorrelation of the quadrature data, and an average of the cross correlation between the in-phase data and the quadrature data are determined (278). The averages are determined over a specified number of data samples. For example, the average of the difference between the autocorrelation of the in-phase data and the autocorrelation of the quadrature data, and the average of the cross correlation between the in-phase data and the quadrature data, can be calculated by the statistics unit 252 of FIGS. 7 and 8. Based on the average difference between the autocorrelation of the in-phase data and the autocorrelation of the quadrature data, and the average cross correlation between the in-phase data and the quadrature data, compensated in-phase data and quadrature data having reduced IQ mismatch are determined (280). For example, the compensated in-phase data and quadrature data having reduced IQ mismatch can be determined by the IQ mismatch compensator 178.

For example, in the process 270, as part of the process for determining compensated in-phase data and quadrature data, the specified number of data samples over which the difference between the autocorrelation of the in-phase data and the autocorrelation of the quadrature data, and the cross correlation between the in-phase data and the quadrature data are averaged can be modified. The process 270 can include setting the specified number to a smaller number at a start of the process for compensating IQ mismatch, and later setting the specified number to a larger number. Determining the compensated in-phase data and quadrature data can include applying a least-mean-square process to determine the compensated in-phase data and quadrature data. The process 270 can include varying a rate of convergence for the least-mean-square process. The process 270 can include setting the rate of convergence to a higher value at a start of the least-mean-square process and later setting the rate of convergence to a lower value. The process 270 can include transmitting a signal having in-phase data and quadrature data, determining coefficients for a least-mean-square process for reducing IQ mismatch in a coupled signal representative of the transmit signal, and applying the coefficients in a least-mean-square process to reduce IQ mismatch in the second signal. In the process 270, determining compensated in-phase data and quadrature data can include determining an image of the first signal by multiplying a conjugate of the first signal with a weight value, and subtracting the image of the first signal from the first signal. The process 270 can include using a least-mean-square process to determine the weight value to minimize the IQ mismatch in the compensated in-phase data and quadrature data.

Figure 14:
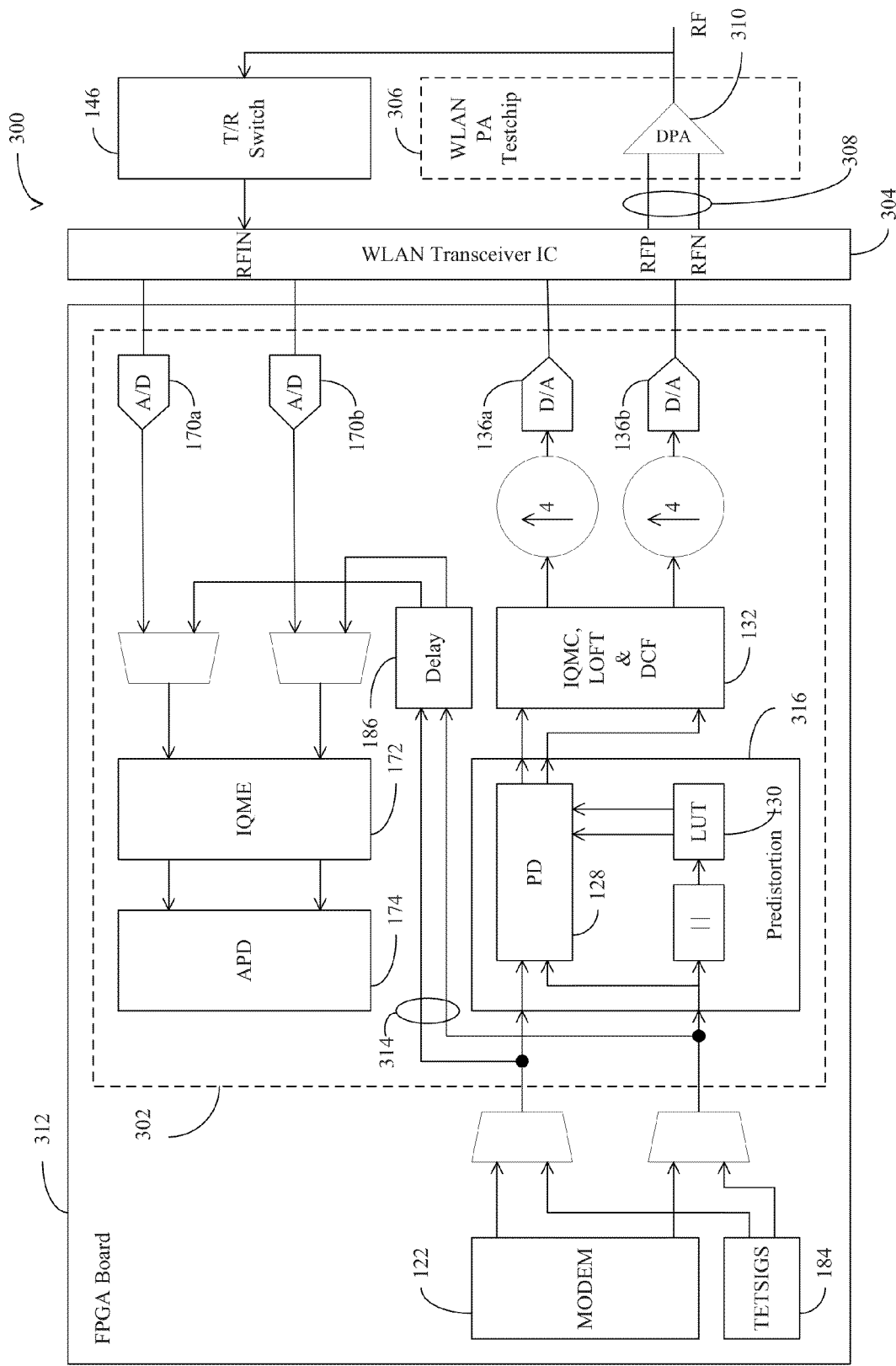
FIG. 14 is a block diagram of an exemplary wireless system.

Referring to FIG. 14, in one implementation, a system 300 includes an adaptive pre-distorter 302 that is coupled to a wireless LAN transceiver 304. The adaptive pre-distorter 302 performs complex gain estimation. A stand-alone power amplifier 306 was designed in a 55 nm digital complementary metal oxide semiconductor (CMOS) process, and the adaptive pre-distorter 302 was implemented with a field programmable gate array (FPGA) 312 that contains the modem 122. The modem 122, the adaptive pre-distorter 302, the transceiver 304, and the power amplifier 306 were combined together in a single chip WLAN radio using 55 nm digital CMOS process. The pre-distorter 302 includes components similar to those of the system 120 (FIG. 2).

In the example of FIG. 14, the RF output 304 of the transceiver 304 is amplified by a digital power amplifier 310 in the power amplifier chip 306. The output of the digital power amplifier 310 goes to a transmit/receive switch 146, which also parasitically couples the transmit output signal back into the receive input where it is down-converted and digitized using the analog-to-digital converter 170 on the FPGA board 312. The received signal contains distortions from the transmitter as well as the receiver. These distortions are addressed in the IQ mismatch estimator (IQME) and corrector. The digital transmit signal 314 is also the ideal signal without distortion, so it is used as a reference signal in the learning algorithm used in the adaptive pre-distortion (APD) block 174. The reference transmit signal 314 is delayed by the delay unit 186 to match the analog loopback delay before comparing with the receive signal. When the pre-distortion block 316 (which includes the pre-distortion circuit 128 and the lookup table 130) and the IQMC, LOFT & DCF block 132 are programmed to provide compensation for these impairments, the ideal transmit signal is only available at the output signal of the modem 122 as the signal 314. Thus, if any further computation is needed that requires an ideal reference signal, we can use the signal 314 as the ideal reference signal. The signal 314 can be the reference signal, if we use the alternative embodiment described in FIG. 14 as the IQ mismatch estimator and the offset cancellation block. The signal 314 can also be used for further learning of residual power amplifier distortion, once an iteration of power amplifier pre-distortion has been performed.

The signal 314 (output signal of the modem 122) is useful when we are computing IQ mismatch in which the pre-distortion block and the following block(s) are working to compensate the distortion of the power amplifier and IQ imbalance, etc. The signal 184 (FIG. 2), which is the output of the IQ mismatch compensator block 132, is useful for built-in self-test as it provides feedback after the IQ mismatch compensator block 132 in the forward path. We can use the IQ mismatch compensator block 132 to generate distortion, make a digital loopback and use the IQ mismatch estimator 172 to learn about the distortion. The signal 184 is also useful for built-in self-test of pre-distortion. The signal 314 at the output of the modem 122 can be used when all distortion corrections are working and we want to learn the residual IQ imbalance using the IQ mismatch estimator 172.

Figure 15:
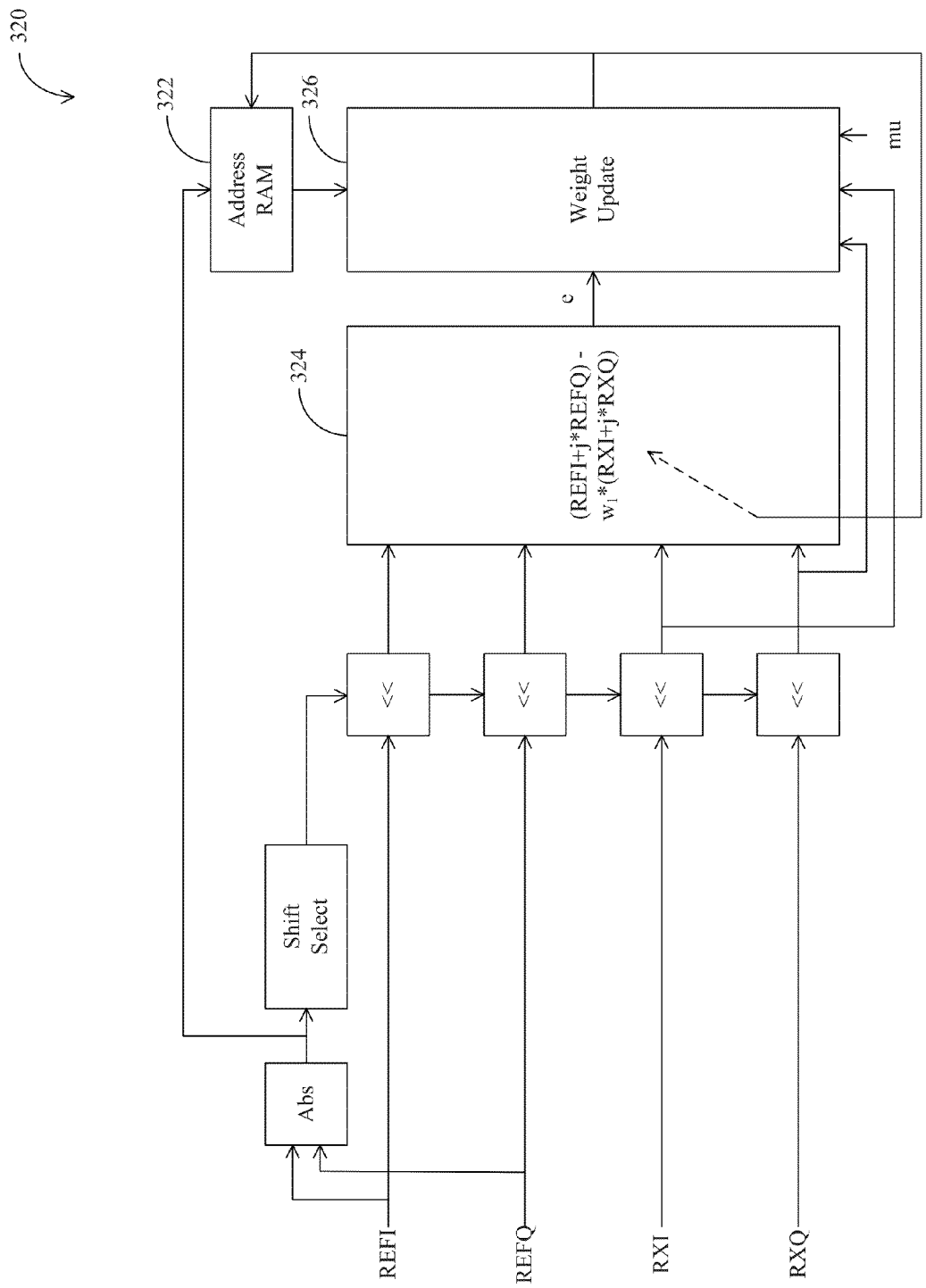
FIG. 15 is a block diagram of an exemplary circuit used to compute complex gain.

Referring to FIG. 15, a circuit 320 used to compute complex gain is provided. The time-aligned reference signal (including REF_I and REF_Q) is compared with the signal from the receiver (including RX_I and RX_Q) with DC and image eliminated. The magnitude of the complex reference signal is computed. The entire dynamic range of the magnitude signal is divided into, e.g., 32 equally spaced intervals. If the reference signal envelope is found to be in an interval, an address RAM 322 selects the corresponding weight for the interval. This weight is used by an error computation block 324 to compute the complex gain by computing the error signal e defined as the difference between the reference signal and the weight times the compensated receive signal. The weight is updated by a weight update block 326 using a least-mean-square algorithm to drive the error signal towards zero in a mean square sense.

As the reference signal traverses signal envelope values in different regions of the dynamic range, the correct weight value is selected from the RAM and updated. As an example, if the TESTSIGS block 184 is programmed to generate a sawtooth waveform, each region of the 32 intervals dividing the dynamic range of the power amplifier is processed equally and about the same number of points are presented to the adaptive pre-distorter to train it to estimate the complex gain in every interval. This achieves faster overall convergence. If, for example, the modulation waveform is used as the training signal, the complex gain can be computed while the payload data is being transmitted. In this case, the different regions of the total dynamic range see different number of points and it takes longer to train all 32 weights.

When the signal traverses the lowest intervals where the power amplifier is linear, convergence takes longer due to very small increments by the weight update block. This is corrected by normalizing the input based on the envelope of the reference signal. When the reference signal drops, all four inputs are shifted left by an equal amount to allow the use of the entire dynamic range available with the use of a 12-bit data path. This is similar to the use of normalized least-mean-square algorithm. This normalization helps achieve similar convergence times irrespective of which interval the complex gain is estimated for.

A number of implementations have been described. Nevertheless, it will be understood that various modifications may be made. For example, elements of one or more implementations may be combined, deleted, modified, or supplemented to form further implementations. As yet another example, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

What is claimed is:

1. An apparatus comprising:
    an input node to receive a first signal having in-phase (I) data and quadrature (Q) data, the first signal comprising a plurality of data samples;
    a correlation module to determine an autocorrelation of the in-phase data, an autocorrelation of the quadrature data, a difference between the autocorrelation of the inphase data and the autocorrelation of the quadrature data, and a cross correlation between the in-phase data and the quadrature data;
    an averaging module to determine an average of the difference between the autocorrelation of the in-phase data and the autocorrelation of the quadrature data, and an average of the cross correlation between the in-phase data and the quadrature data, the averages being determined over a specified number of data samples; and
    a compensation module to, based on the average difference between the autocorrelation of the in-phase data and the autocorrelation of the quadrature data, and the average cross correlation between the in-phase data and the quadrature data, determine compensated in-phase data and quadrature data having reduced IQ mismatch.

2. The apparatus of claim 1, comprising a control module to control the specified number of data samples over which the difference between the autocorrelation of the inphase data and the autocorrelation of the quadrature data, and the cross correlation between the in-phase data and the quadrature data are averaged.

3. The apparatus of claim 2 in which the control module sets the specified number to a smaller number at a start of a process for compensating IQ mismatch, and later sets the specified number to a larger number.

4. The apparatus of claim 1 in which the compensation module determines the compensated in-phase and quadrature data based on a least-mean-square process.

5. The apparatus of claim 4, comprising a control module to control a rate of convergence for the least-mean-square process.

6. The apparatus of claim 5 in which the control module sets the rate of convergence to a first value at a start of the least-mean-square process and later sets the rate of convergence to a second value that is lower than the first value.

7. The apparatus of claim 1, comprising:
an output node to transmit a second signal having in-phase and quadrature data; and
a second compensation module to receive a coupled signal representative of the second signal, determine coefficients for a least-mean-square process that can reduce IQ mismatch in the coupled signal, and apply the coefficients in the least-mean square process to reduce IQ mismatch in the second signal.

8. The apparatus of claim 1 in which the compensation module determines the compensated in-phase and quadrature data by subtracting an image of the first signal from the first signal, in which the image of the first signal is determined by multiplying a conjugate of the first signal with a weight value.

9. The apparatus of claim 8 in which the compensation module uses a least-mean square process to calculate the weight value to minimize the IQ mismatch in the compensated in-phase and quadrature data.

10. A method comprising:
receiving, at a receiver, a first signal having in-phase (I) data and quadrature (Q) data, the first signal comprising a plurality of data samples;
determining a difference between an autocorrelation of the in-phase data and an autocorrelation of the quadrature data;
determining a cross correlation between the in-phase data and the quadrature data;
determining an average of the difference between the autocorrelation of the inphase data and the autocorrelation of the quadrature data, and an average of the cross correlation between the in-phase data and the quadrature data, the averages being determined over a specified number of data samples; and
determining, based on the average difference between the autocorrelation of the in-phase data and the autocorrelation of the quadrature data, and the average cross correlation between the in-phase data and the quadrature data, compensated in-phase data and quadrature data having reduced IQ mismatch.

11. The method of claim 10, comprising, as part of the process for determining compensated in-phase data and quadrature data, modifying the specified number of data samples over which the difference between the autocorrelation of the in-phase data and the autocorrelation of the quadrature data, and the cross correlation between the in-phase data and the quadrature data are averaged.

12. The method of claim 11, comprising setting the specified number to a first number at a start of the process for compensating IQ mismatch, and later setting the specified number to a second number that is larger than the first number.

13. The method of claim 10 in which determining the compensated in-phase data and quadrature data comprises applying a least-mean-square process to determine the compensated in-phase data and quadrature data.

14. The method of claim 13, comprising varying a rate of convergence for the least mean-square process.

15. The method of claim 14, comprising setting the rate of convergence to a first value at a start of the least-mean-square process and later setting the rate of convergence to a second value that is lower than the first value.

16. The method of claim 10, comprising:
transmitting a second signal having in-phase data and quadrature data;
determining coefficients for a least-mean-square process for reducing IQ mismatch in a coupled signal representative of the transmit signal; and
applying the coefficients in the least-mean-square process to reduce IQ mismatch in the second signal.

17. The method of claim 10 in which determining compensated in-phase data and quadrature data comprises:
determining an image of the first signal by multiplying a conjugate of the first signal with a weight value; and
subtracting the image of the first signal from the first signal.

18. The method of claim 17, comprising using a least-mean-square process to determine the weight value to minimize the IQ mismatch in the compensated in-phase data and quadrature data.

19. A method comprising:
receiving an input signal having in-phase (I) data and quadrature (Q) data, the input signal comprising a plurality of data samples;
determining compensation coefficients for compensating IQ mismatch in a receiver by applying a least-mean-square process to a function representing a compensated signal, the function including a first component representing a data sample multiplied by a first coefficient, a second component representing a conjugate of the data sample multiplied by a second coefficient, and a third component representing a DC offset, the least-mean-square process jointly determining the first coefficient, the second coefficient, and the DC offset; and
determining, based on the first coefficient, the second coefficient, and the DC offset, compensated in-phase data and quadrature data having reduced IQ mismatch.

20. The method of claim 19 in which the least-mean-square process comprises several iterations, and the first coefficient is updated in successive iterations by adding to the first coefficient a component derived from multiplying the data sample by an error term, in which the error term represents a difference between a delayed ideal signal and the compensated signal.

* * * * *